(12) United States Patent
Naquin et al.

(10) Patent No.: US 8,607,417 B2
(45) Date of Patent: Dec. 17, 2013

(54) SYNTHETIC ROPE SOCKET

(76) Inventors: Andrew Naquin, Cut Off, LA (US);
Richard D. Haun, Houston, TX (US);
Richard E. Hall, Covington, LA (US);
Peter L. Kazunas, Mandeville, LA (US)

( * ) Notice: Subject to any disclaimer, the term of this patent is extended or adjusted under 35 U.S.C. 154(b) by 499 days.

(21) Appl. No.: 12/459,063

(22) Filed: Jun. 26, 2009

(65) Prior Publication Data

US 2009/0320248 A1 Dec. 31, 2009

Related U.S. Application Data

(60) Provisional application No. 61/077,119, filed on Jun. 30, 2008, provisional application No. 61/203,134, filed on Dec. 19, 2008.

(51) Int. Cl.
*F16G 11/14* (2006.01)
(52) U.S. Cl.
USPC .......................................... 24/115 K; 403/210
(58) Field of Classification Search
None
See application file for complete search history.

(56) References Cited

U.S. PATENT DOCUMENTS

| | | | | |
|---|---|---|---|---|
| 421,120 A * | 2/1890 | Young | | 403/210 |
| 521,872 A * | 6/1894 | Yeager et al. | | 24/135 R |
| 857,717 A * | 6/1907 | Brown | | 403/210 |
| 1,300,794 A * | 4/1919 | Wendt-Wriedt | | 269/103 |
| 1,380,800 A * | 6/1921 | Haworth | | 403/211 |
| 1,427,114 A * | 8/1922 | Martin | | 403/210 |
| 1,475,627 A * | 11/1923 | Gates | | 403/210 |
| 1,657,722 A * | 1/1928 | Page | | 403/209 |
| 2,101,681 A * | 12/1937 | Josephs | | 24/660 |
| 2,155,536 A * | 4/1939 | Fauria | | 403/210 |
| 2,223,389 A * | 12/1940 | Schaedler | | 24/132 R |
| 2,381,193 A * | 8/1945 | Vaszin | | 403/209 |
| 3,083,991 A * | 4/1963 | Gale | | 403/210 |
| 3,702,709 A * | 11/1972 | Shaffer | | 403/158 |
| 3,867,046 A * | 2/1975 | Fox | | 403/210 |
| 4,164,378 A * | 8/1979 | Linehan | | 403/210 |
| 4,358,212 A * | 11/1982 | Compton | | 403/210 |
| 4,523,355 A * | 6/1985 | Rosa | | 24/115 N |
| 5,359,962 A * | 11/1994 | Loverich | | 119/223 |
| 6,820,726 B1 * | 11/2004 | Ericson et al. | | 187/411 |
| 7,922,414 B2 * | 4/2011 | Palmquist | | 403/209 |

* cited by examiner

*Primary Examiner* — Jack W. Lavinder
(74) *Attorney, Agent, or Firm* — Juan J. Lizarraga

(57) ABSTRACT

A device for termination of synthetic rope, with an eye socket substantially free of sharp edges, a bale at the top of the eye socket with an eye for attachment of connecting links, a groove for receiving synthetic rope. In addition, the device includes a bale with extended sides at the top of the eye socket, a thimble within a synthetic rope eye contained within the extended sides and restrained from translation by pin. A shroud is also provided for protection at the bottom of the eye socket at the synthetic rope splice. The device is intended to aid in the efficient and safe connections to other objects such as other synthetic mooring lines, steel wire rope, and anchor chains.

5 Claims, 4 Drawing Sheets

SYNTHETIC ROPE SOCKET

This application claims priority from U.S. Provisional application Ser. No. 61/077,119 ("the '119 application") filed Jun. 30, 2008, and U.S. Provisional application Ser. No. 61/203,134 filed Dec. 19, 2008 ("the '134 application"). The '119 and '134 applications are incorporated herein by reference.

BACKGROUND OF THE INVENTION

1. Field of the Invention

The present invention relates to a device for terminating synthetic mooring line ends currently used in the mooring of permanent and temporary offshore drilling and production facilities. More particularly, the present invention relates to a grooved, preferably metal socket used on the ends of synthetic mooring lines which enhances the protection of the mooring line, decreases installation time and costs, and preferably utilizes industry standard wire rope or chain connectors.

2. General Background of the Invention

The oilfield, due to increased pressures from the marketplace, has steadily looked to drilling in deeper waters. While the current floating drilling fleets have been undergoing significant upgrades to handle the increased weights put on them by the longer steel mooring lines, an alternative had to be developed to reduce said weights. On the production side of the equation, if an oil discovery is found in deepwater, a floating production unit is needed and faces the same design challenges as the drilling rigs. As an alternative to steel, synthetic lines have begun to emerge around the world. While the synthetic ropes have been undergoing significant changes in design, they have also been requiring cumbersome connections requiring specialized fabrication, longer installation times, and significantly longer man hours. The synthetic rope socket of the present invention solves these many problems.

Vessels around the world are configured with many automated operations for securing wire rope sections for connecting and disconnecting which has been an industry standard for many years. Since the synthetic rope socket has the same outside configuration, installers will have the ability to use such devices on synthetic lines with little or no modifications, something not afforded to them now. Securing a synthetic line on deck for connection or disconnection on many occasions requires elaborate braiding of smaller lines around the large line to prevent slipping and falling to the sea floor, a very time-consuming process.

Another benefit to the synthetic rope socket is that it has no sharp edges. This will allow the synthetic rope to be rolled on the winch drums, which again will save time and offer the synthetic rope some protection. Today, installation crews have to remove all connectors, such as shackles and pins, before loading the winches, because all of these have sharp edges and can destroy the integrity of the synthetic mooring lines, another time-consuming process.

Previous rope end termination devices are depicted in U.S. Pat. No. 5,735,628, incorporated herein by reference.

BRIEF SUMMARY OF THE INVENTION

The apparatus of the present invention includes a synthetic eye socket used to terminate the ends of synthetic rope lines offering protection, strength, and ease of connections.

The apparatus also allows the field installation of synthetic ropes already possessing an eye due to the incorporation of a removable thimble that facilitates both the addition of an existing line or the separation of an installed line without separating the rope eye. This feature offers both increased safety and time savings while offshore in suddenly changing and severe environmental conditions.

The apparatus also allows for the interconnection of synthetic ropes without the use of other intermediate hardware. The apparatus also has built in provisions to secure the synthetic rope eyes to prevent fouling during operations.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 8 also shows pin 30 and pin 50.

DETAILED DESCRIPTION OF THE INVENTION

Figure 1:
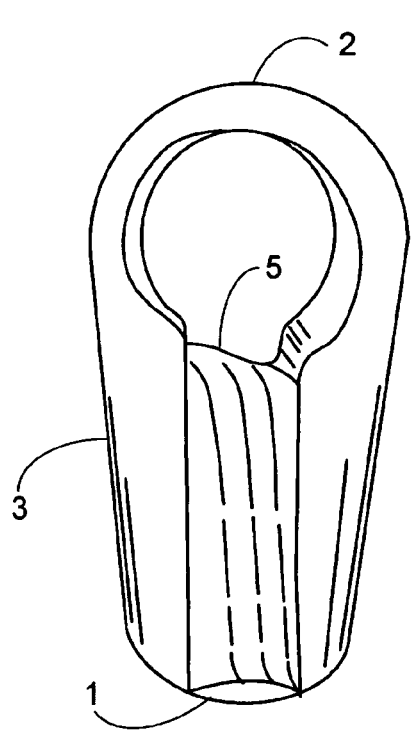
FIG. 1 is a perspective view of a preferred embodiment of the apparatus of the present invention, synthetic eye socket 3. The drawing shows a groove 1 cast or forged into the sides of the synthetic eye socket 3 for which the rope will set into for protection. Another feature is a bale 2 that will allow for the attachment of connecting links commonly found in the industry eliminating many of the specialty connectors currently needed. The synthetic eye socket 3 will preferably have a conical shape overall. The rope groove 1 will preferably run up the one side, through the eye 4 of the bale 2, and down the opposite side.

FIG. 1 is a perspective view showing the profile of a synthetic eye socket 3. The preferably solid cast or forged socket will preferably have a groove 1 running from bottom to top on both sides as shown in FIG. 1. Preferably, synthetic rope 12 containing a synthetic rope eye 11 will enter and exit the synthetic eye socket 3 with a splice performed just below the synthetic eye socket 3. FIG. 1 shows the bale 2 that is the attaching point for connections. These connections can be various other items in the system, such as anchor chain, wire rope, another synthetic line with socket, etc. The bale 2 will allow the use of connecting links, much like the steel wire rope sockets that have been in use for years. These connecting links can be received in the eye 4 of the bale 2. For this reason the commonly used connecting links will now work with synthetic rope lines reducing installation times and cost. The figures show the conical shape of the synthetic eye socket 3, which preferably has no sharp edges that could damage the synthetic lines. This design would allow the installation crew to load the synthetic lines and connectors onto the winch. Currently the crews are using shackles and H-links that cannot be spooled on the winch. As the rope comes off the winch during installation, the crew must stop the operation, tie off the rope because they are unable to use the shark's jaws built into the deck, and install the shackles or H-links. This is a time-consuming, dangerous process that could be eliminated by using the synthetic eye socket 3 as it can be spooled onto the winches without damaging the synthetic rope. FIG. 1 shows the top 5 of the groove 1 that is rounded to smoothly transition the synthetic rope from one side of the synthetic eye socket 3 to the other. Typically and preferably, the type of rope being used would determine the diameter of the bend, as the different synthetic lines have their own required minimum-bending diameter (see FIG. 3).

Figure 2:
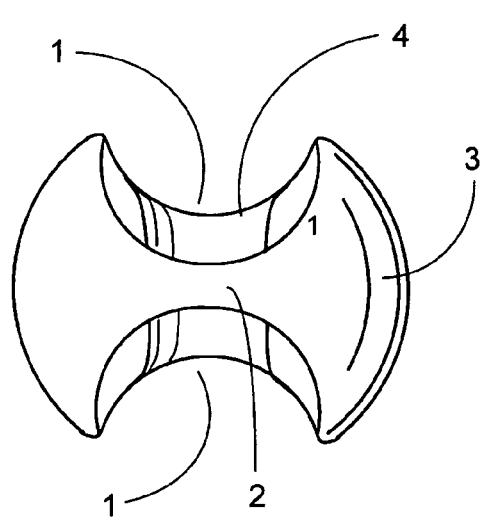
FIG. 2 is a top view of a preferred embodiment of the apparatus of the present invention. As seen in the top view the synthetic eye socket 3 will have bale 2 across the top that will allow for the use of common connecting links. This top view also shows the conical shape of the synthetic eye socket 3, and the grooves 1 for the synthetic rope.

FIG. 2 is a top perspective of the synthetic eye socket 3. FIG. 2 shows the bale 2 from the top that would allow the use of common connecting links. FIG. 2 also shows the groove 1 and the solid center core of the synthetic eye socket 3, unlike steel wire rope sockets that have a hollow core. FIG. 2 shows the rounded edges of the synthetic eye socket 3 that eliminates sharp protruding edges found on the shackles currently being used to connect synthetic line today. It is those sharp or squared off edges that prevent shackles from being used on the winch drums. This synthetic eye socket eliminates that problem.

Figure 3:
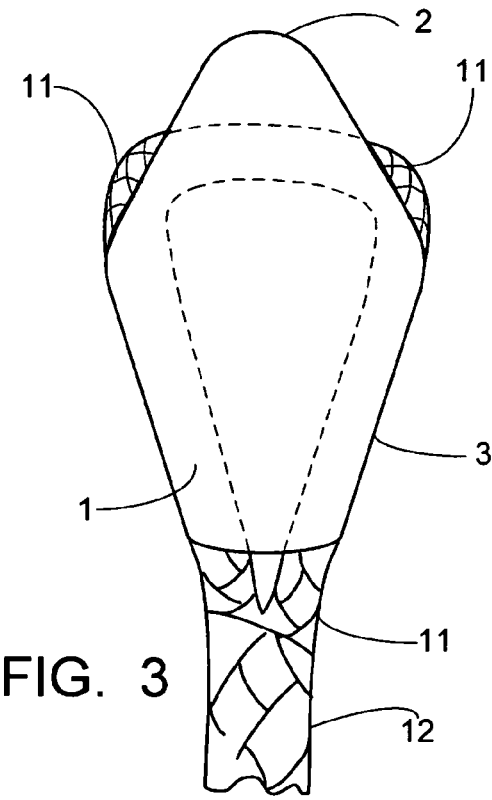
FIG. 3 is a side view of a preferred embodiment of the apparatus of the present invention. The side view depicted in FIG. 3 shows the synthetic rope 12 with synthetic rope eye 11 entering and exiting the grooves 1 at the bottom of the synthetic eye socket 3 and making the turn at the top of the synthetic eye socket 3, while staying below the bale 2. This side view also shows the conical shape of the synthetic eye socket 3 that allows for the use of "sharks jaws" and other like items that are currently being safely used for steel wire rope, thus reducing installation times and costs.

FIG. 3 is a side view showing a cross section of the synthetic rope 12 containing a synthetic rope eye 11 entering the synthetic eye socket 3 from the bottom, crossing over just below the bale 2, and exiting at the bottom on the opposite side of entry. The synthetic eye socket 3 will preferably have a conical shape, much like the steel wire rope sockets commonly found in the industry for the past 30 years. The similar shape will allow the use of the same deck enhancements found on the installation vessels around the world. This would allow for a more safe installation and a decrease in installation times and costs.

The synthetic eye socket 3 preferably consists of a one-piece cast or forged metal socket. Depending on the application, a wide range of metals could be utilized during the manufacturing process, usually dictated by the conditions predicted at the offshore location. The socket would preferably also be sized to fit any of the various sizes of synthetic lines currently being used in the industry today and any custom lines developed for future projects. It is intended that the synthetic eye socket be adaptable to very large synthetic rope with diameters in the range of 7½ inches and greater.

Figure 4:
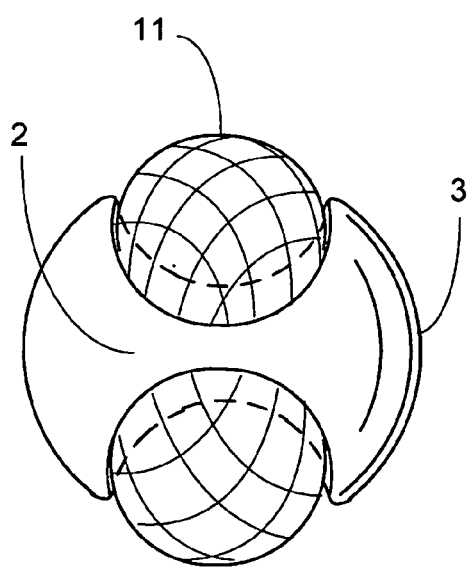
FIG. 4 is a top view of a preferred embodiment of the apparatus of the present invention showing a synthetic rope eye 11 of a synthetic rope 12 (preferably polyester when it is a mooring line, for example) running up groove 1, under bale 2, and down the opposite side.

FIG. 4 is a top view of the synthetic eye socket 3 showing a synthetic rope eye 11 of a synthetic rope 12 (preferably polyester when it is a mooring line, for example) running up groove 1, under bale 2, and down the opposite side. Among the materials used for synthetic rope would also be "high strength" materials such as Kevlar®, Amsteel Blue® and SpectraFiber®.

Figure 5:
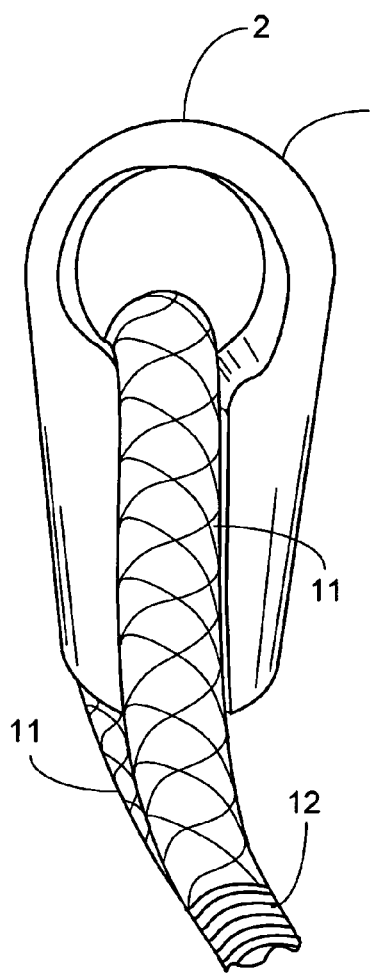
FIG. 5 is a perspective view of a preferred embodiment of the apparatus of the present invention, synthetic eye socket 3, having a synthetic rope eye 11 of a synthetic rope 12 received therein. The synthetic rope 12 is spliced just below the synthetic eye socket 3 with a splice.

FIG. 5 is a perspective view of the synthetic eye socket 3, having a synthetic rope eye 11 of a synthetic rope 12 received therein. The synthetic rope 12 is spliced just below the synthetic eye socket 3.

Figure 6:
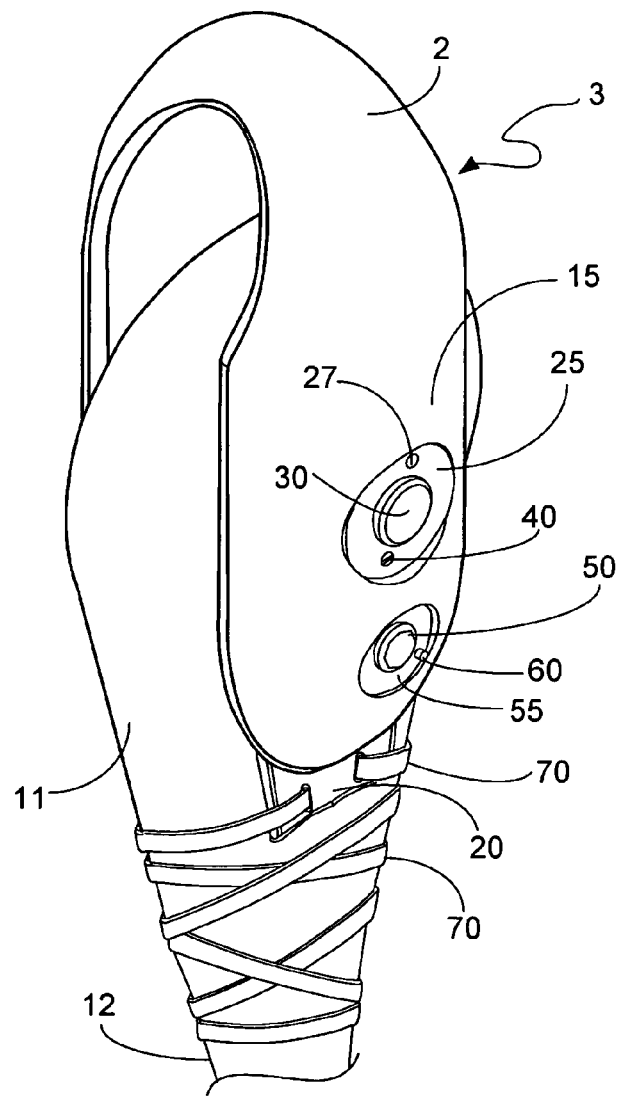
FIG. 6 is a perspective view of an alternative embodiment of the synthetic eye socket 3. The synthetic rope 12 containing a synthetic rope eye 11 is restrained by a thimble 20. The thimble 20 is restrained in the synthetic eye socket 3 incorporating extended sides 15. A pin 30 secures the thimble 20 to the extended sides 15. A nut 25 restrains the pin 30. A keeper 40 is provided within one of the spanner holes 27 which prevents the nut 25 from loosening from the pin 30. Lashing 70 passes through the thimble 20 to secure each synthetic rope eye 11 and the synthetic rope 12. A second pin 50 is shown with a nut 55 and retainer 60 through the spanner hole 27.

FIG. 6 is a perspective view of an alternative embodiment of the synthetic eye socket 3 incorporating a bale 2, extended sides 15, and a thimble 20 around which the synthetic rope eye 11 is restrained within the extended sides 15 of the synthetic socket 3. The thimble 20 restraint is provided by a pin 30 which is further retained by a nut 25. The nut 25 is provided with spanner holes to allow all sharp edges to be recessed thereby preventing damage to the synthetic rope eye 11. The nut 25 is restrained from loosening following assembly by a keeper 40. The keeper shown is a screw that is located within the spanner holes 27 and threaded into the thimble 20.

FIG. 6 also shows that the thimble 20 provides for lashing 70 to restrain the synthetic rope eye 11. Since the thimble 20 is removable from the synthetic eye socket 3 extended sides 15, the synthetic rope 12 can be braided to form the synthetic rope eyes 11 in advance of attaching the synthetic eye socket. The synthetic rope eye 11 is placed around the thimble 20 and restrained by lashing 70. The thimble 20, with the synthetic rope 12 attached, is secured within the extended sides 15 of the synthetic eye socket by the pin 30. The pin is restrained by the nut 25 and the nut is prevented from loosening by the keeper 40. Since no torsional loads are provided to the keeper 40 due to its position, it does not require further restraint.

Figure 7:
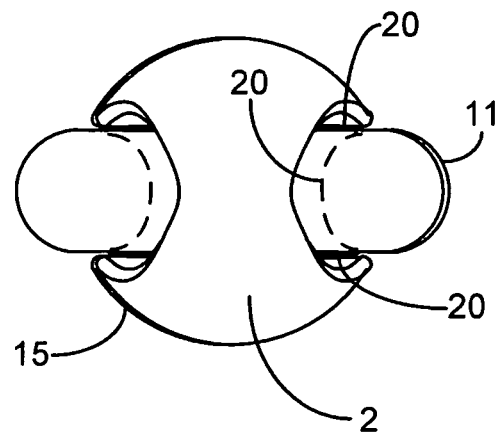
FIG. 7 is an end view showing that the bale 2 of the synthetic eye socket 3 and the extended sides 15 which are generally circular in shape to facilitate offshore rollers, winches and spooling without damaging synthetic rope and other components.

FIG. 7 is the view from the thimble 20 end indicating that the configuration of the extended sides 15 are of a round configuration and fully protect the thimble 20 edges. It is also evident that even if the sizes of the extended sides 15 allow the synthetic rope eyes 11 to extend outward, there are no sharp edges on which the synthetic rope can be damaged.

Figure 8:
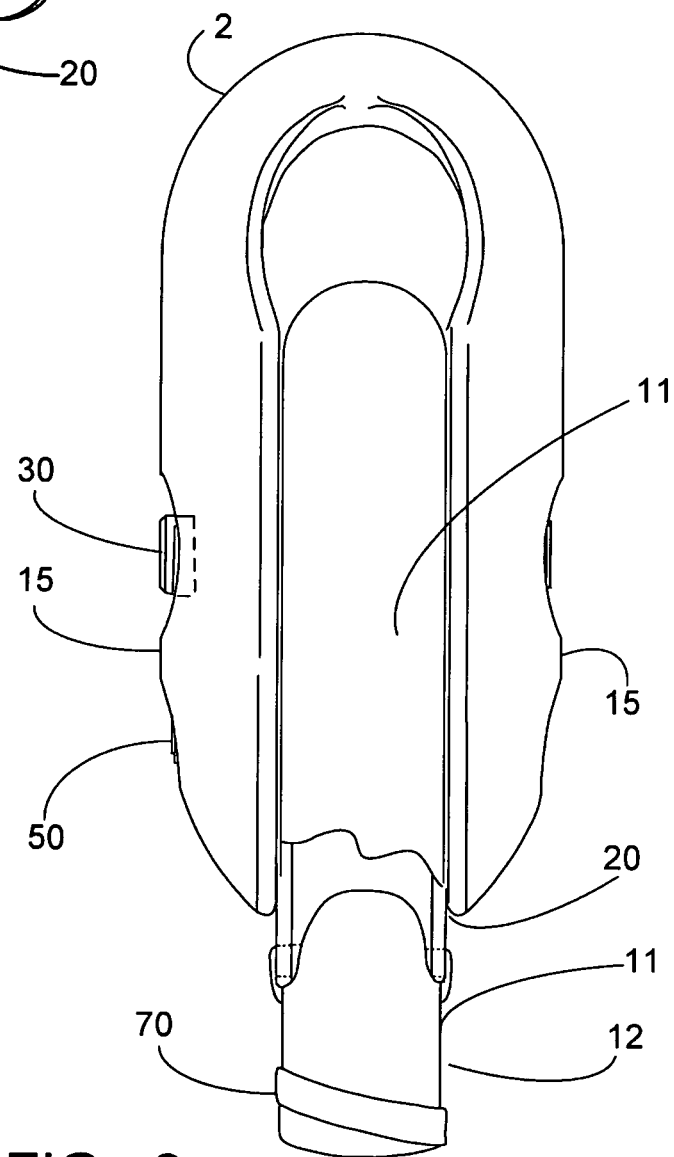
FIG. 8 is a side view showing the extended sides 15 which provide protection of the edge of the thimble 20 and a portion of the synthetic rope eye 11 from damage.

FIG. 8 shows the extended sides 15 and the protection that they provide to the thimble 20 and the synthetic rope eye 11. A section of the synthetic rope eye 11 is cut away to show the thimble 20.

Figures 9, 10:
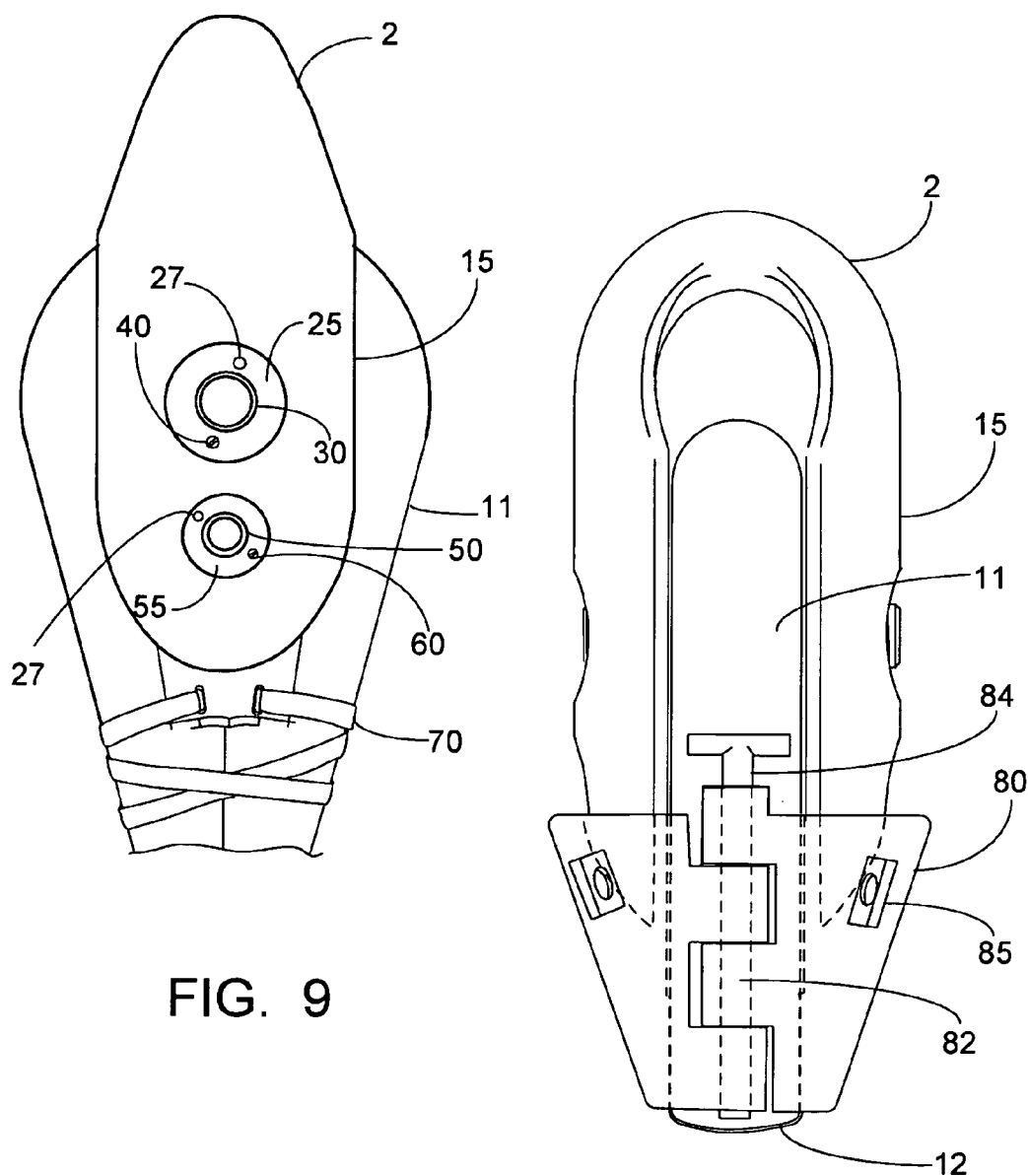
FIG. 9 is a front view showing the pin 30 and a second pin 50. The second pin 50 prevents rotation of the thimble with the synthetic eye socket 3.
FIG. 10 is a side view showing the use of a shroud 80 that would generally be attached in the field and prevents damage by use of deck restraint equipment. The shroud 80 is shown with a hinge 82 with handling padeyes 85 to provide ease of field attachment and handling of the synthetic eye connector once attached.

FIG. 9 is a side view showing use of a second pin 50 optionally preventing rotation. The second pin 50 also includes a nut 55 with spanner holes 57. A keeper 60 located within the spanner holes 27. The nut 25 is shown attached to the threaded end of the pin 30. Also shown are the spanner holes 27 on the nut 25. Similar spanner holes 27 are provided on the other end of pin 30. The second pin 50 is shown with a nut 55, spanner holes 27 and a keeper 60 within one of the spanner holes 27.

FIG. 10 is a side view showing use of a shroud 80 to allow use of shark jaws and other deck equipment that can potentially damage synthetic rope 12 or the synthetic rope eye 11. The shroud 80 contains a hinge 82 to facilitate rapid field utilization along with a longitudinal pin 84 to trap the shroud 80 around the synthetic rope 12. Handling implements are provided as padeyes 85 on the shroud. The padeyes 85 may be attached to other portions of the shroud 80 or to the hinge 82. The shroud 80 contains rounded surfaces and is generally conical in shape to provide a means for restraint of the synthetic eye socket 3 safely under high loads. The shroud is generally intended to be used as a temporary field tool to restrain the synthetic eye socket in the event a component in the bale 2 is to be removed.

Evident in FIG. 10 is that the dimension of the bale 2 and extended sides 15 of the synthetic eye socket 3 allow for the interconnection of pairs of synthetic eye sockets 3.

The synthetic eye socket will most likely replace the current industry standard wide-body shackles or the combination D-shackle and spool inserts. An advantage to using the synthetic eye socket is that the socket utilizes connecting links that have been used to successfully connect steel wire rope and steel anchor chains for many years. This will significantly reduce the installation time and costs due to the smaller sizes of the connectors over the larger shackles. Another advantage is the lack of sharp edges that could damage the synthetic lines allowing the rope to be spooled directly on the vessel winches without stopping to change connections. Also, the synthetic rope socket will utilize the equipment on the back deck of most installation vessels that have been used for years on steel wire rope installations. These devices have been proven to increase the safety of the installation crews while decreasing installation times and the associated costs.

The invention claimed is:

1. A method for the protection of a synthetic rope end to be braided around a thimble comprising the steps of:
    placing the thimble around which the synthetic rope end is to be braided within and between the extended sides and below a bale with sides and extended sides being of a round configuration with no sharp edges; the bale with an eye as a connecting point for connecting links; restraining the thimble in the extended sides by insertion of a first pin through the extended sides and thimble and securing the first pin with a first nut; splicing the synthetic rope end around the thimble and securing the splice with lashing; and
placing a shroud near the extended sides of the bale where the synthetic rope end is spliced to permit support during handling without damage to the synthetic rope.

2. A method for the protection of a synthetic rope end braided around a thimble comprising the steps of:
    placing the thimble around which the synthetic rope end is braided within and between the extended sides and below a bale with sides and extended sides of a round configuration with no sharp edges; the bale with an eye as a connecting point for connecting links; restraining the thimble in the extended sides by insertion of a first pin through the extended sides and thimble and securing the first pin with a first nut; and
placing a shroud near the extended lower sides of the bale where the synthetic rope end is braided to permit support during handling without damage to the synthetic rope.

3. A device for termination of synthetic rope, comprising:
    a bale with two sides without sharp edges with an eye as a connecting point for connecting links;
    a thimble to restrain synthetic ropes spliced to form a rope eye;
    a pin that transfers load from the thimble to the bale sides;
    retainers on the pin that are recessed along with the pin to prevent damage to other segments of synthetic rope when the device is reeled onto winch drums;
    extended sides of the bale of a round configuration with no sharp edges which protect the restrained rope and spliced rope eye;
    a second pin to prevent rotation of the thimble and bale, said second pin being restrained by a recessed nut.

4. A device for termination of synthetic rope, comprising:
    a bale with two sides without sharp edges with an eye as a connecting point for connecting links;
    a thimble to restrain synthetic ropes spliced to form a rope eye;
    a pin that transfers load from the thimble to the bale sides;
    retainers on the pin that are recessed along with the pin to prevent damage to other segments of synthetic rope when the device is reeled onto winch drums;
    extended sides of the bale of a round configuration with no sharp edges which protect the restrained rope and spliced rope eye;
    a shroud is provided near the extended lower sides of the bale to permit support during handling without damage to the synthetic rope and spliced rope eye; and
    where the shroud is hinged and includes at least one pin and padeye.

5. The device of claim 3 wherein a shroud is provided near the extended sides of the bale to permit support during handling without damage to the synthetic rope and spliced rope eye; and where the shroud is hinged and includes at least one pin and padeye.

* * * * *